US006630542B2

(12) United States Patent
Ghatta et al.

(10) Patent No.: US 6,630,542 B2
(45) Date of Patent: Oct. 7, 2003

(54) PREPARATION OF POLYESTER RESINS USING A MASTERBATCH OF POLYARYLENEAMIDE

(75) Inventors: Hussain Al Ghatta, Fiuggi (IT); Sandro Cobror, Pozzilli (IT)

(73) Assignee: Sinco Ricerche S.p.A. (IT)

( * ) Notice: Subject to any disclaimer, the term of this patent is extended or adjusted under 35 U.S.C. 154(b) by 0 days.

(21) Appl. No.: 09/891,777

(22) Filed: Jun. 26, 2001

(65) Prior Publication Data

US 2002/0002251 A1 Jan. 3, 2002

(30) Foreign Application Priority Data

Jun. 28, 2000 (IT) ...................... MI2000A1448

(51) Int. Cl.[7] .............................................. C08L 67/02
(52) U.S. Cl. ...................................................... 525/425
(58) Field of Search .......................................... 525/425

(56) References Cited

U.S. PATENT DOCUMENTS 5,340,884 A 8/1994 Mills et al. ................. 125/420

FOREIGN PATENT DOCUMENTS

| EP | 0 964 031 | 12/1999 |
| WO | WO 98/39388 | 9/1998 |

OTHER PUBLICATIONS

European Search Report for patent application No. EP 01 11 5060 dated Oct. 7, 2002.

*Primary Examiner*—Patricia A. Short
(74) *Attorney, Agent, or Firm*—Cook, Alex, McFarron, Manzo, Cummings & Mehler, Ltd.

(57) ABSTRACT

Use of masterbatches of polyarylene amides in polyester resins containing from 10 to 40% by weight of polyamide resin in the preparation of mixtures of aromatic polyester rensins added with the polyamide resin at a concentration of less than 15% by weight.

10 Claims, No Drawings

PREPARATION OF POLYESTER RESINS USING A MASTERBATCH OF POLYARYLENEAMIDE

DESCRIPTION

The present invention relates to the use of masterbatches of polyarylene-amide resins, in which the polyamide resin is dispersed finely and in a stable manner in a matrix of an aromatic polyester resin, in the preparation of polyester resins to which the polyarylene-amide resin is added in quantities smaller than those present in the masterbatch.

It relates in particular to the use of masterbatches in the preparation of polyester resins suitable for the manufacture of containers having good gas-barrier properties.

PRIOR ART

Aromatic polyester resins, particularly polyethylene terephthalate, are used in ever increasing quantities in the production of beverage containers. Since the gas-barrier properties of these resins are not good enough to keep beverages, particularly carbonated beverages, unchanged for sufficiently long periods, attempts have been made to improve their barrier properties by adding to them polyarylene-amide resins, in particular poly(m.xylylene adipamide) (poly-MXD-6) which, as is known, have particularly good barrier properties.

However, polyarylene-amide resins are not compatible with aromatic polyester resins so that the dispersion obtained by mixing the two resins in the molten state does not enable best use to be made of the gas-barrier properties of the polyarylene-amide resins.

A good dispersion of the polyarylene-amide resin can be achieved in accordance with the method described in EP-A-964031 in which the polyester resin is premixed in the molten state with a dianhydride of a tetracarboxylic acid, in particular pyromellitic dianhydride (PMDA), used in quantities of less than 2% by weight, and the polyamide resin is then added, also in the molten state.

The mixtures thus obtained have good properties of impermeability to oxygen and carbon dioxide.

The production of containers (bottles) from polyester resins to which polyarylene-amide resins have been added involves the preparation, from time to time, of mixtures suitable for the requirements of individual users, in dependence on the particular requirements of the bottle manufacturer, resulting in wasting of energy and inefficient use of production plants.

The availability of masterbatches of polyarylene-amide resin for use by container manufacturers, in dependence on their requirements, could solve the problem, provided that the microstructure of the masterbatch were retained upon its dilution in the molten state with the polyester resin, and that this structure were also retained upon the subsequent processing of the resin for the production of containers and/or for other applications.

DESCRIPTION OF THE INVENTION

It has now unexpectedly been found that masterbatches of aromatic polyester resin containing from 10% to 40% by weight of polyarylene-amide resin, in particular, poly-MXD-6, prepared in accordance with the method described in EP-A-964031, can be diluted with the polyester resin and the resin thus obtained, containing the polyamide in concentrations of less than 15% by weight, can subsequently be processed without thereby compromising the stability of the dispersion of the polyarylene-amide resin.

It has in fact been found that the dispersion of the polyarylene-amide resin in the polyester matrix in the form of domains with average dimensions of less than 1 micron not only remains unchanged after dilution with the polyester resin but, in some cases, is further improved as a result of a reduction of the average size of the dispersed particles.

The microstructure indicated above is also maintained in the manufactured products.

The above-described result is unexpected, bearing in mind that the masterbatches rich in polyarylene-amide resin which are described in EP-A-964031 (containing more than 50 and preferably 80–90% by weight of polyamide resin) separate into phases when they are diluted with the polyester resin.

The polyester resins usable in the preparation of the masterbatches, as well as those to which the masterbatches are added, are produced by polycondensation by known methods, of dicarboxylic aromatic acids, preferably terephthalic acid with diols having 2–12 carbon atoms, such as ethylene and butylene glycols and 1,4 dimethylolcyclohexane.

Preferred resins are polyethylene terephthalate and copolyethylene terephthalates in which up to about 20% in moles of terephthalic acid units are replaced by units derived from isophthalic acid and/or naphthalene dicarboxylic acids.

Copolyethylene terephthalates containing up to about 5% of isophthalic acid units are preferably used in the preparation of the containers and bottles.

The intrinsic viscosity of the polyester resins used in the preparation of the masterbatches is generally between 0.3 and 0.7 dl/g.

After mixing, in the molten state, with the dianhydride of the tetracarboxylic acids and subsequent addition of the polyamide resin, the intrinsic viscosity may be brought to values greater than 0.7 dl/g, for example, between 0.8 and 1.2 dl/g, by polycondensation in the solid state (SSP) operating in accordance with known methods, at a temperature of about 170 to 220° C.

The treatment in the solid state is preceded by a crystallization stage, also carried out in accordance with known methods.

The mixing of the resins, in the molten state, with the dianhydride of the tetracarboxylic acid is carried out with the use of single-screw or twin-screw extruders with relatively short residence times in the extruder (generally less than 180 seconds), operating at temperatures from 270° to 300° C.

The polyarylene-amide resin is mixed, in the extruder, with the polyester resin, premixed with the dianhydride, or is added directly into the extruder for mixing the polyester resin and the dianhydride, in a zone downstream of the premixing zone.

The masterbatches contain from 10 to 40% by weight of the polyamide resin. Quantities greater than 40% by weight are not of practical use since they involve extrusion difficulties.

The polyarylene-amide resins usable are obtained from aryl diamines and from dicarboxylic aliphatic acids with 6–22 carbon atoms, preferably adipic, suberic and dodecanoic acids.

Poly-MXD-6 is the preferred resin.

The average numeral molecular weight of the resin is generally between 8,000 and 50,000.

Polyamides with crystallization rates similar to that of the polyester resin are preferred.

The terminal $NH_2$ groups of the polyamide may be reacted with epoxy compounds or with aliphatic anhydrides to improve their dispersibility in the polyester resin.

The dianhydrides of tetracarboxylic aromatic acids are preferred; pyromellitic dianhydride is the preferred compound. Other examples of dianhydrides are dianhydrides of 3,3',4,4'-benzophenone tetracarboxylic and 2,2bis(2,4-dicarboxyphenyl)ether acids.

Trimellitic anhydride and similar anhydrides can also be used: the obtained masterbatches present a fine dispersion of the polyarilene amide in the polyester matrix, which remains substantially unchanged after dilution of the masterbatch with the polyester resin and in the manufactured articles thereof.

The intrinsic viscosity of the resin is measured in a solution of 0.5 g of resin in 100 ml of an 80/40 by weight solution of phenol and tetrachloroethane, at 25° C. in accordance with ASTM D 4603-86.

The following examples are provided by way of non-limiting illustration of the invention.

COMPARISON EXAMPLE 1

5 kg/h of copolyethylene terephthalate (COPET) with IV=0.8 dl/g and containing 2% by weight of isophthalic acid (IPA) units was supplied continuously, after drying at 140° C. under vacuum for at least 12 hours, together with 500 g/h of poly-MXD-6 007 from Mitsubishi Gas Chemical, into a twin-screw extruder with contrarotating and non-intermeshing screws, provided with a flat extrusion head 30 mm wide.

The extrusion conditions were as follows:
temperature throughout the extruder: 275° C.,
residence time in the extruder: 1.5 minutes.

SEM (scanning electron microscopy) photographs of the surfaces of the pellets treated with formic acid at 25° C. for 60 hours showed that poly-MXD-6 was dispersed in the polyester matrix in the form of domains with average dimensions of at least 1.5 micron.

COMPARISON EXAMPLE 2

5 kg/h of COPET with 2% by weight of IPA units and with IV=0.6 dl/g was supplied continuously, together with 25 g/h of a mixture of 20% by weight of pyromellitic dianhydride (PMDA) in COPET having the characteristics indicated above, into a twin-screw extruder of the type used in Comparison Example 1. The mixture was extruded under the conditions of Comparison Example 1.

The pellets obtained were then subjected to polycondensation in the solid state (SSP) at 190° C. in nitrogen to give an IV of 0.8 dl/g.

The product obtained was supplied, after drying at 140° C. under vacuum for at least 12 h, together with 500 g/h of poly-MXD-6 007 (10% by weight), into a twin-screw extruder having the characteristics given in Comparison Example 1.

The extrusion conditions were the same as in Comparison Example 1.

SEM photographs indicated a microstructure in which the polyamide was dispersed in the form of domains with average size of 0.4 to 0.2 microns.

EXAMPLE 1

2 kg of COPET with an IV of 0.6 dl/g and with 2% by weight of IPA was mixed with 0.1% by weight of PMDA under the conditions of Comparison Example 1.

The pellets were then subjected to SSP under the conditions of Comparison Example 2 to give an IV of 0.8 dl/g.

The product obtained was supplied, after drying under vacuum at 140° C. for at least 12 hours, with 30% by weight of MXD-6 007, into a twin-screw extruder with contrarotating and non-intermeshing screws of the type used in Comparison Example 2.

The extrusion conditions were the same as in Comparison Example 2.

The product thus obtained was mixed, in the molten state, with COPET with IV=0.8 dl/g and 2% by weight of IPA under the same extrusion conditions as in Comparison Example 2, to give a mixture containing 5% by weight of poly-MXD-6 007.

SEM photographs indicated a uniform dispersion of poly-MXD-6 007 in the polyester matrix in the form of domains with average size of 0.1–0.3 microns.

COMPARISON EXAMPLE 3

A masterbatch of 30% by weight of poly-MXD-007 was prepared under the conditions of Example 1, but without the use of PMDA.

The masterbatch was then used to prepare a mixture of 5% by weight of poly-MXD-6 007 in COPET (IV=0.8 dl/g and 2% by weight of IPA) as in Example 1.

SEM photographs showed a dispersion of poly-MXD-6 007 in the polyester matrix in the form of domains with average size of 1.5–2 mm.

What is claimed is:

1. A process for preparing aromatic polyester resins containing less than 15 wt % of a polyarylene amide by dilution of a masterbatch of a polyarylene amide in an aromatic polyester resin containing from 10 to 40 wt % of polyarylene amide wherein the masterbatch is prepared by mixing in the molten state, an aromatic polyester resin with a dianhydride of a tetracarboxylic acid, in a quantity of from 0.05 to 2% by weight, under conditions to disperse the polyarylene amide in the polyester resin matrix in the form of domains having average size of less than 1 micron and the masterbatch thus obtained is melt-mixed with the polyester resin.

2. A process according to claim 1 in which the dianhydride of a tetracarboxylic acid is pyromellitic dianhydride.

3. A process according to claim 1, in which the mixture of the polyester resin and of the dianhydride of the tetracarboxylic acid used in the preparation of the masterbatch is subjected to polycondensation in the solid state to obtain an intrinsic viscosity greater than 0.7 dug and is then mixed, in the molten state, with the polyarylene amide, and the masterbatch thus obtained is added to the polyester resin having intrinsic viscosity greater than 0.7 dug.

4. A process according to claim 1, in which the masterbatch is prepared with the use of polyarylene amides having crystallization rates comparable to that of the polyester resin.

5. A process according to claim 1, in which the polyester resin with which the masterbatch is mixed is selected from polyethylene terephthalate and copolyethylene terephthalate in which up to 20% in moles of units derived from terephthalic acid are replaced by units derived from isophthalic and/or naphthalene dicarboxylic acid.

6. A process according to claim 1 in which the polyarylene amide is poly(m.xylylene adipamide).

7. A process according to claim 6 wherein the poly (m.xylylene adipamide) has an average size of 0.1–0.3 microns.

8. A process according to claim 1, in which the polyester resin with which the masterbatch is prepared is selected from polyethylene terephthalate and copolyethylene terephthalate in which up to 20% in moles of units derived from terephthalic acid are replaced by units derived from isophthalic and/or naphthalene dicarboxylic acid.

9. A process according to claim 1 wherein the polyarylene amide domains have an average size of 0.1–0.3 microns.

10. A process for preparing aromatic polyester resins containing less than 15 wt % of a polyarylene amide by dilution of a masterbatch of a polyarylene amide in an aromatic polyester resin containing from 10 to 40 wt % of polyarylene amide wherein the masterbatch is prepared by mixing in the molten state, an aromatic polyester resin with trimellitic anhydride, in a quantity of from 0.05 to 2% by weight, under conditions to disperse the polyarylene amide in the polyester resin matrix in the form of domains having average size of less than 1 micron and the masterbatch thus obtained is melt-mixed with the polyester resin.

* * * * *